United States Patent [19]

Pollock et al.

[11] 4,038,420

[45] July 26, 1977

[54] METHOD OF BREWING BEER

[76] Inventors: James Richard Allan Pollock, 56 New Lane Hill, Tilehurst; Michael Joseph Weir, 24 Appleby End, both of Reading, Berkshire, England

[21] Appl. No.: 673,703

[22] Filed: Apr. 5, 1976

Related U.S. Application Data

[63] Continuation of Ser. No. 562,959, March 28, 1975, abandoned, which is a continuation of Ser. No. 367,824, June 7, 1973, abandoned.

[30] Foreign Application Priority Data

| June 27, 1972 | United Kingdom | 30061/72 |
| Oct. 13, 1972 | United Kingdom | 47404/72 |
| Mar. 28, 1973 | United Kingdom | 14916/73 |

[51] Int. Cl.² .................... C12C 9/00; C12C 11/04
[52] U.S. Cl. ................................... 426/16; 426/29
[58] Field of Search .................... 426/11, 13, 16, 29

[56] References Cited

U.S. PATENT DOCUMENTS

| 3,332,779 | 7/1967 | Krabbe et al. ............... 426/16 |
| 3,345,179 | 10/1967 | Pollock et al. ............... 426/16 X |

FOREIGN PATENT DOCUMENTS 107,538  6/1917  United Kingdom

OTHER PUBLICATIONS

Hind; H. L., Brewing Science and Practice, vol. II, Chapman & Hall Ltd., London, 1950, (pp. 746, 747, 786, 787, 831–833, 866, 867, 872, 873).

*Primary Examiner*—David M. Naff
*Attorney, Agent, or Firm*—Larson, Taylor and Hinds

[57] ABSTRACT

Beer is prepared by a process involving separately fermenting with yeast a malt wort containing malt extract, and an adjunct sugar solution, separating yeast after fermentation and blending the fermented malt wort and the fermented sugar solution to provide a beer product closely similar in flavor to beer made by fermenting a wort containing malt extract and a sugar adjunct. This process allows the fermentation of solutions having a low content of nitrogenous substances without producing unpleasant flavors, and the process provides substantial savings in capital and operating costs in breweries.

8 Claims, No Drawings

METHOD OF BREWING BEER

This is a continuation of application Ser. No. 562,959, filed Mar. 28, 1975, which is in turn a continuation of application Ser. No. 367,824, filed June 7, 1973, both of said applications being now abandoned.

This invention relates to brewing, in particular to brewing beer and to worts and their fermentation in the preparation of beer, and to the products of such preparation.

In conventional fermentation systems long in use for making beer from brewers' worts, various nitrogenous components of the wort, and oxygen, are necessry to support an adequate growth of yeast in the early stages of fermentation, and the original yeast and the yeast newly formed, bring about the fermentation. The yeast is eventually separated from the beer and collected. A part of the yeast is then subsequently used to begin the fermentation in a further quantity of wort and the excess yeast, usually 3–4 times as much, is disposed of, mainly for cattle feed or for porcessing to preparing products for human consumption.

It is generally supposed that the maintenance in the wort of an adequate supply of amino acids, and other nitrogenous substances capable of acting as nutrient substances for the yeast, are essential if the production of unwanted flavours such as that of diacetyl is to be avoided. The maximum limit to which these nutritious substances, as present in the wort, can be diluted by the use of starchy adjuncts, or other sources of fermentable material which do not at the same time provide nitrogenous substances, is regarded as being determined by the tendency to produce such unwanted flavours during fermentation.

It is also true that, when the concentration of such nutritious substances is reduced below that ordinarily present in the worts used in brewing, the rate at which the wort is fermented declines. This tendency can be dealt with by increasing the concentration of yeast which is used, but this change leads in turn to a further increase in the concentration of unwanted volatile substances found in beer.

We have found, however, that this production of unwanted flavours surprisingly does not occur unacceptably when the concentrations of nitrogenous substances assimilable by yeast is very low, even when the fermenting mixture of yeast and wort is strongly agitated so that fermented liquors having bland flavours may readily be prepared. In fermentation of worts prepared using high proportions of adjuncts, the time needed for completion of the fermentation has hitherto been very long. It was further found that when, in such worts, the concentration of yeast was increased to a level sufficient to bring about the fermentation in a comparatively short time, or the mixture of wort and yeast was stirred, or both of those processes were applied, or the wort was pumped through a cake of yeast and filter-aid, the product continued to have a bland flavour and not to exhibit undesirable flavours.

This invention provides a method of preparing beers by fermentation of types normally used in brewing which is useful in leading to substantial savings in capital and operating costs in breweries. The invention allows the use of solutions having a low content of nitrogenous substances to be substantially increased, without the danger of producing unpleasant flavours.

According to the invention there is provided a method of preparing beers in which are used a first wort which has a high concentration of nitrogenous substance including α-amino acids and a second wort which as a low concentration of nitrogenous substances including α-amino acids; wherein the first wort has a total concentrating of soluble nitrogenous substances, expressed as total nitrogen present, which is equal to or greater than 600 mg per liter, and a concentration of α-amino acids, expressed as nitrogen present equal to or greater than 150 mg per liter: wherein the second wort has a total concentration of soluble nitrogenous substances, expressed as total nitrogen present, which is equal to or less than 200 mg per liter, and a concentration of α-amino acids, expressed as nitrogen present, equal to or less than 70 mg per liter; and wherein at least one of the worts has been subjected to fermentation and is mixed with the other wort, the fermentable consititutents of this other wort being subjected to fermentation.

The nitrogen concentrations expressed hereinbefore and hereinafter have all been corrected to a solution of specific gravity of 1.055.

The first wort is intended to be prepared under suitable mashing conditions and from a grist of suitable composition so as to produce the desired concentrations of soluble nitrogenous substances and α-amino acids, and it is, in general, similar to a wort conventionally prepared using malt and well known mashing conditions.

The second wort may contain at least one of the following substances: sucrose, glucose, fructose, maltose, maltotriose, and carbohydrates obtained by acidic or enzyme-mediated breakdown of maize starch or other starcy adjuncts.

The first wort and the second wort may be used in a method of preparing beer in which the first wort is fermented by yeast to prepare a first beer, the second wort is fermented by yeast to prepare a second beer, and the first beer and the second beer are blended so as to produce a final beer which may be further processed.

It will be readily understood that, in an individual brewery, using this method it will often be convenient to use the excess yeast from the fermentation of the first worts to ferment second worts though, as the time taken to ferment the first wort, and any subsequent processing given to it, will normally be longer, often much longer, than that needed to ferment the second wort, it will usally be the case that the yeast used to ferment the second wort will be taken from a central stock of yeast which will includes yeast from several earlier fermentations of worts used to prepare "first beers" and also yeast collected from the fermentations used to prepare "seocnd beers". That is to say, there will in practice be no one-to-one correlation between the yeast, a particular batch of second beer and that obtained from a particular batch of first beer. The overall position will, in such a brewery, however, be that the growth of yeast occurs largely in the fermentation used to make the first beer and the excess yeast from this is used to make the second beer, through the yeast used to ferment the second wort may be utilized either continuously or in several successive batches. It will be clear also that, for instance, where to or more types of yeast are used by a brewery, the second beer may be fermented with a yeast originating from a fermentation to make a beer of different quality from that desired in the final blend and, in exceptional circumstances, the invention may be applied in such a way that the first beer is a beer or a concentrate of a beer prepared by any known method elsewhere that in the brewery where the second beer is prepared. It is preferred to subject the yeast to a washing procedure before it is used to prepare the second beer.

It is preferred to use, in the fermentation of the second worts a concentration of yeast which is greater than 5.7g per liter of wort, and to stir the mixture of yeast and wort to ensure good mixing during fermentation. In addition to modes of operation of this fermentation which involve the treatment of individual batches, continuous fermentation means may also be used (as they may also be used for the fermentation of the wort used for preparing the first beer).

In a preferred embodiment of the invention the specific gravity of the second wort is below that of the first wort so that the blend of the two beers allows the final mixed beer to have a desired original gravity. This allows a substantially portion of the water which would otherwise have to be stored in the whole bulk of beer to be passed more rapidly to the end of the process.

The method of the invention also permits savings to be made at the stage of the boiling and cooling of wort prior to fermentation. In currently used methods the adjunct, if added as sugar, is placed in a kettle with an apropriate amount of water and this added volume must be boiled and then cooled before fermentation. In a preferred embodiment of the invention, the sugar or sugar syrup is dissolved in the appropriate amount of water by direct mixing, immediately prior to fermentation, to provide a solution sufficiently sterile to be submitted directly to fermentation, without any need for it to be boiled and cooled. In other circumstances, pateurization of this solution may replace boiling and cooling.

While it is preferred to complete the treatment and filtration of the first beer before the filtered second beer is blended into it, beer may be prepared by completing the blending operation before the whole process is completed, and further processing the blended beer in the normal way.

The following examples of the application of this method of the invention are given without intention to restrict the invention thereby:

EXAMPLE 1

A hopped wort (wort A1) was prepared from malt by infusing it with hot water, straining off the liquid and washing the residue with hot water, to obtain a sweet wort; boiling the latter with 0.55 gm/liter hops, separating the hops, and aerating the wort. Wort A1 had a specific gravity of 1.046, a soluble nitrogen content of 1116 mg/liter, and a α-amino nitrogen content of 230 mg./liter. It was divided into two portions, which were treated as follows:

A first portion of wort A1 (20 liters) was treated with 55 gm of a typical top-fermenting yeast and the mixture allowed to ferment. When fermentation was complete, the yeast was filtered off, to provide beer A1.

A second wort (wort B1) was prepared by dissolving a corn syrup (containing glucose, maltose and other starch-degration products) in water to provide a solution (wort B1) of specific gravity 1.046 having a soluble nitrogen content of 72mg/liter and an α-amino nitrogen content of 2.6mg/liter. This wort (20 liters) was submitted to fermentation by yeast, in a continuous fermenter of the type described by Narziss and Hellich (Brauwelt, 1971, 1491) in which the fermentable solution is passed through a cake composed of yeast and kieselguhr, so as to obtain a fermented product, beer B1.

Beers A1 and B1 were mixed in the porportions of 70 parts to 30 parts respectively to provide Beer C1.

A second portion of wort A1 (14 liters) blended with wort B1 (6 liters) to provide a solution (wort D1) of specific gravity 1.046. This wort (20 liters) which corresponds to a conventionally prepared wort, was treated with 55 gms of yeast and the mixture allowed to ferment. When fermentation was complete, the yeast was filtered off, to provide beer D1.

Beers C1 and D1 were compared by flavour and, by specific analyses, for volatile substances. The flavours were found by a panel of tasters to be closely similar. The analytical results for a number of important volatile substances of the beers shows that their concentrations in the beers were as follows (all concentrations in parts per milion, p.p.m.)

|  | Beer C1 | Beer D1 |
| --- | --- | --- |
| Isoamyl acetate | 0.47 | 0.56 |
| Isoamyl alcohols | 83.3 | 71.2 |
| β-Phenylethanol | 33.9 | 34.1 |

Any differences in composition here shown are no more than ordinarily experienced in successive conventional fermentations of worts in a given brewery, and would not be expected to affect flavour.

EXAMPLE 2

A hopped wort (wort A2) was prepared from malt in the usual fashion and was well aerated after boiling. It had a specific gravity of 1.060, a soluble nitrogen content of 1316 mg/liter and an α-amino nitrogen content of 300mg/liter. Wort A2 (5 liters) was treated with 13.75 gm of yeast which was a typical top-fermenting yeast and the mixture was left to ferment. When fermentation was complete, the yeast was filtered off, to provide beer A2.

A corn syrup containing glucose, maltose and other degradation products of starch was dissolved in water to provide a solution (wort B2) of specific gravity 1.031. It had a soluble nitrogen content of 66.5mg/liter and an α-amino nitrogen content of 1.8mg/liter. Wort B2 (5 liters was treated with 13.75 gm of the same yeast as was used to make beer A42 and the mixture was allowed to ferment with stirring. When fermentation ceased, the yeast was filtered off to provide beer B2.

Beers A2 and B2 were blended in the proportions of 70 parts to 30 parts (2.1 liters to 0.9 liters) to provide Beer C2.

A wort D2 was prepared in the same way as for wort D1 described in Examples 1, and fermented with the yeast used to ferment worts A2 and B2. When fermentation ceased, the yeast was filtered off, to provide beer D2.

Beers C2 and D2 were compared in respect of major volatile substances formed during fermentation. The results were as follows:

| Substance | Concentration (p.p.m.) in | |
| --- | --- | --- |
|  | Beer C2 | Beer D2 |
| Ethyl acetate | 15.1 | 14.8 |
| Isobutanol | 42.3 | 49.0 |
| Isoamyl acetate | 0.68 | 0.67 |
| Isoamyl alcohols | 91.9 | 96.0 |
| Ethyl caproate | 0.04 | 0.04 |
| Ethyl caprylate | 0.22 | 0.13 |
| Caproic acid | 1.45 | 1.31 |
| β-Phenyl ethanol | 41.2 | 48.1 |
| Caprylic acid | 3.5 | 4.1 |

| | Concentration (p.p.m.) in | |
|---|---|---|
| Substance | Beer C2 | Beer D2 |
| Capric acid | 1.22 | 1.6 |

Any differences in composition here shown are no more than ordinarily experienced in successive conventionally prepared beers in a given brewery, and would not be expected to affect flavour.

In an alternative method of preparing beer the first worst is incompletely fermented by yeast, the second wort is added with more yeast and fermentation is completed so as to produce a beer of high original gravity which is further processed and diluted to provide a beer of a desired original gravity.

Initially a first wort is prepared which may be an all-malt wort or one prepared from malt with a limited proportion of adjunct; this is pitched with yeast in a conventional fashion and fermentation allowed to proceed; and then, when a substantial amount of yeast growth has occured but preferably before the fermentation of the sugars is complete, a second wort is added which contains fermentable sugars and the concentration of yeast increased by adding more yeast so that the fermentation may be readily completed to provide a beer of high original gravity; the beer is processed and the final high gravity beer diluted with de-aerated water so as to provide a final beer of the desired original gravity.

We prefer to increase the yeast concentration to at least 27 gm per liter, and to make the final dilution after the beer, produced at the end of the overall fermentation, has been stored at a low temperature and at least coarsely filtered.

While it is preferred that the initial stage of the fermentation shall be conducted in a conventional fashion, the second stage may be effected in a continuous fermenter, preferably in a plug-flow fermenter in which the yeast is formed into a mixture with kieselguhr or similar support and the partly fermented beer is forced through this mixture.

The yeast which is formed during the first stage of the fermentation is preferably at least partly removed, to provide yeast for further pitching. Any excess is preferably used to supplement the yeast added later so that some of the yeast finally recovered at the end of the fermentation can be rejected.

The following experiment is described as an example of this method which is not intended to limit the scope of the invention.

EXAMPLE 3

A wort was made by infusing ground malt with hot water and the resultant mash held at 65° C for 1 hour after which time the liquid was strained off and the residual grain was washed with hot water to obtain a sweet wort. 3.6.gm of hops were added per liter of the sweet wort and the liquid was boiled for 50 minutes after which the hops were separated. The resultant wort, having a specific gravity of 1.065, a total soluble nitrogen content of 1350 mg per liter and an α-amino nitrogen content of 335 mg per liter, was aerated and 2.9 gm of pressured yeast were added per liter of wort.

The mixture was allowed to ferment for 48 hours after which time the yeast was separated by centrifugation. Corn syrup, (containing glucose, maltose and other starch-degradation products) and yeast were added to the particularly fermented wort so that the specific gravity of the mixture was increased to 1.120 and the yeast concentration was increased to 29gm/per equivalent pressed yeast liter of mixture. The yeast used comprised 8 parts by weight of fresh yeast to 2 parts by weight of yeast recovered from the first part of the fermentation.

When fermentation was complete yeast was once again removed by centriguation and the resultant beer was analysed and found to have the following properties.

| | |
|---|---|
| Original Gravity | 1.120 |
| Ethyl acetate | 32.0 |
| Isobutanol | 75.5 |
| Isoamyl acetate | 4.71 |
| Isoamyl alcohols | 197.6 |
| Ethyl caproate | 0.25 |
| Ethyl caprylate | 0.39 |
| β-Phenyl ethanol | 78.2 |
| Caprylic acid | 3.56 |
| Capric acid | 0.28 |

(all concentrations of volatile substances in parts per million).

The beer was then diluted with de-aerated water to reduce the original gravity to 1.052 and was analysed once again for major volatile substances. The results were as follows:

| | |
|---|---|
| Ethyl acetate | 13.3 |
| Isobutanol | 29.7 |
| Isoamyl acetate | 1.95 |
| Isoamyl alcohols | 80.2 |
| Ethyl caproate | 0.10 |
| Ethyl caprylate | 0.17 |
| β-Phenyl ethanol | 29.4 |
| Caprylic acid | 1.56 |
| Capric acid | 0.12 |

(all concentrations in parts per million).

The flavour of the beer made as described above was found to be vary acceptable when tasted by a panel of tasters.

We claim:

1. In a method of brewing beer in which a brewer's wort containing malt extract fermentable sugar adjunct is fermented with yeast and, after fermentation is complete, the yeast is filtered off to provide a beer, the improvement which comprises:
    1. separately fermenting with yeast a malt wort containing said malt extract, said malt wort having a minimum total concentration of soluble nitrogenous substances, expressed as total nitrogen present, of 600 mg. per liter, and a minimum concentration of alpha amino acids, expressed as nitrogen present, of 150 Mg. per liter;
    2. removing the yeast from the malt wort after fermentation is complete to provide a fermented malt wort;
    3. separately fermenting with yeast with stirring, in an amount of at least 5.7 gm. equivalent pressed yeast per liter, an aqueous sugar solution containing said fermentable sugar, said aqueous sugar solution having a maximum total concentration of soluble nitrogenous substances, expressed as total nitrogen present, of 200 mg. per liter, and a maximum concentration of alpha amino acids, expressed as nitrogen present, of 70 mg. per liter;

4. removing the yeast from the sugar solution after fermentation ceases; and
5. blending the fermented malt wort and the fermented aqueous sugar solution to provide a beer product, said beer product being closely similar in flavor to a beer made by fermenting said brewer's wort.

2. An improved method according to claim 1 in which the specific gravity of the malt wort is higher than that of the sugar solution.

3. A method as claimed in claim 1 in which the sugar solution is formed by diluting with water a concentrated sugar preparation immediately prior to fermentation and in which the sugar solution is fermented without being first boiled.

4. A method as claimed in claim 1 in which the sugar solution is pasturized before fermentation.

5. A method as claimed in claim 1 in which the fermentation product of the malt wort is concentrated before it is blended with the fermentation product of the sugar solution.

6. A method as claimed in claim 1 in which said sugar solution is prepared by diluting and dissolving corn syrup in water.

7. A method as claimed in claim 1 wherein said sugar solution is made by dissolving sugar or sugar syrup in water.

8. A method as claimed in claim 1 in which the aqueous sugar solution is un-hopped.

* * * * *